United States Patent
Snook et al.

(10) Patent No.: US 6,442,204 B1
(45) Date of Patent: Aug. 27, 2002

(54) VIDEO ENCODING METHOD AND SYSTEM

(75) Inventors: Daniel Snook, Palaiseau; Françoise Groliere, Nogent-sur-Marne; Jean Gobert, Maisons-Alfort, all of (FR)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/559,896

(22) Filed: Apr. 26, 2000

(30) Foreign Application Priority Data

Apr. 30, 1999 (EP) .............................. 99401068

(51) Int. Cl.[7] .................................................. H04N 7/36
(52) U.S. Cl. ............. 375/240.16; 348/699; 375/240.15
(58) Field of Search ...................... 375/240.15, 240.16; 348/699; H04N 7/36

(56) References Cited

U.S. PATENT DOCUMENTS

| | | | | |
|---|---|---|---|---|
| 5,666,461 A | * | 9/1997 | Igarashi et al. ......... | 375/240.15 |
| 5,731,850 A | * | 3/1998 | Maturi et al. .......... | 375/240.16 |
| 6,014,181 A | * | 1/2000 | Sun ....................... | 375/240.16 |
| 6,263,025 B1 | * | 7/2001 | Iizuka ................... | 375/240.16 |

FOREIGN PATENT DOCUMENTS

| | | | |
|---|---|---|---|
| EP | 0577365 A2 | 1/1994 | .......... H04N/7/133 |
| EP | 0782343 A2 | 7/1997 | ............ H04N/7/50 |
| WO | WO9907159 | 2/1999 | ............ H04N/7/50 |

* cited by examiner

Primary Examiner—Howard Britton
(74) Attorney, Agent, or Firm—Russell Gross

(57) ABSTRACT

In the Improved PB-frames mode, one of the options of the H.263+ Recommendation, a macroblock of a B-frame may be encoded according to a forward, a backward or a bidirectional prediction mode. The invention relates to a method of encoding a sequence of pictures defining a strategy for the choice of a prediction mode among the three possible ones in the encoding of B-macroblock. This strategy is based upon SAD(Sum of Absolute Difference) calculations and motion vectors coherence and allows to use backward prediction when scene cuts occur. The calculations are here performed on original pictures allowing less calculation and reduction in CPU burden. The invention also relates to an encoding system for carrying out said method and including a computer-readable medium storing instructions that allow the implementation of this method.

3 Claims, 3 Drawing Sheets

VIDEO ENCODING METHOD AND SYSTEM

FIELD OF THE INVENTION

The invention relates to a method of encoding a source sequence of pictures comprising the steps of:

dividing a source sequence into a set of group of pictures, each group of pictures comprising a first frame, hereafter referred to as I-frame, followed by at least a pair of frames, hereafter referred to as PB-frames;

dividing each I-frame and PB-frame into spatially non-overlapping blocks of pixels;

encoding the blocks from said I-frame, hereafter referred to as I-blocks, independently from any other frame in the group of pictures;

deriving motion vectors and corresponding predictors for the blocks from the temporally second frame of said PB-frame, hereafter referred to as the P-blocks, based on the I-blocks in the previous I-frame or the P-blocks in the previous PB-frame;

deriving for each block from the first frame of said PB-frame, hereafter referred to as a B-block, a forward motion vector from said motion vector of the P-block with same location, allowing to obtain for each B-block an associated I-block in the previous I-frame or an associated P-block in the previous PB-frame, hereafter referred to as If-block or Pf-block, respectively;

deriving for each B-block of the first frame of said PB-frame, a backward motion vector from said motion vector of the P-block with same location, allowing to obtain for each B-block an associated P-block in the P-frame of said PB-frame, hereafter referred to as the Pb-block;

choosing a prediction mode for the encoding of each B-block;

predictively encoding the P-blocks of the second frame of said PB-frame based on the I-blocks in the previous I-frame or the P-blocks in the previous PB-frame;

predictively encoding the B-blocks following the chosen prediction mode.

The invention also relates to a system for carrying out said method.

The invention may be used, for example, in video coding at very low bit rate.

BACKGROUND ART

Standardization of low bitrate video telephony products and technology by the ITU (International Telecommunication Union) are compiled in the standards H.320 and H.324. These standards describe all the requirements to be satisfied for the different components audio, video, multiplexer, control protocol and modem. H.320 is dedicated to videoconferencing or videophony over ISDN (Integrated Services Data Network) phone lines. H.324 is aimed at videophony over GSTN (Global Switch Telephonic Network) analog phone lines. The two standards both support for videocoding the Recommendation H.263, which describes compression of low bitrate video signals. The H.263 Recommendation comprises four optional modes for a video coder. One of these optional modes is called the PB-frames mode, which gives a way of encoding a PB-frame. A second version of the H.263 Recommendation, called H.263+, was developed to improve the image quality and comprises some new options. Thus, an option called Improved PB-frames mode, which is an improvement of the original PB-frames mode, provides a new way of encoding a PB-frame.

A sequence of picture frames may be composed of a series of I-frames and PB-frames. A I-frame consists in a picture coded according to an Intra mode, which means that a I-frame is coded using spatial redundancy within the picture without any reference to another picture. A P-frame is predictively encoded from a previous P or I-picture. Thus, when coding a P-picture, temporal redundancy between the P-picture and a previous picture used as a picture reference, which is mostly the previous I or P-picture, is used in addition to the spatial redundancy as for a I-picture. A B-picture has two temporal references and is usually predictively encoded from a previous P or I-picture and the P-picture currently being reconstructed. A PB-frame consists of two successive pictures, a first B-frame and a subsequent P-frame, coded as one unit.

A method of coding a PB-frame in accordance to the PB-frames mode is illustrated in FIG. 1. It is shown a PB-frame composed of a B-frame B and a P-frame P2. The B-frame B is surrounded by a previous P-picture P1 and the P-picture P2 currently being reconstructed. It is shown in this example a P-picture P1, P1 may also be a I-picture and serves as a picture reference for the encoding of the P-picture P2 and the B-picture B. A B-block from the B-frame, in the PB-frames mode, can be forward or bidirectionally predictively encoded. The encoding of a B-block being forward predicted is based on the previous I or P-picture P1 and the encoding of a B-block being bidirectionally predicted is based on both the previous I or P-picture P1 and the P-picture P2 currently being reconstructed. A set of motion vectors MV is derived for the P-picture P2 of the PB-frame with reference to the picture P1. In fact for each macroblock of P2, a macroblock of P1 is associated by block matching and a corresponding motion vector MV is derived. Motion vectors for the B-block are derived from the set of motion vectors derived previously for P1. Therefore a forward motion vector MVf and a backward motion vector MVb are calculated for a B-block as follows:

$$MVf = (TRb \times MV)/TRd$$
$$MVb = ((TRb - TRd) \times MV)/TRd \qquad (1)$$
$$MVb = MVf - MV$$

where

TRb is the increment in the temporal reference of the B-picture from the previous P-frame P1, and TRd is the increment in the temporal reference of the current P-frame P2 from the previous I or P-picture P1.

It is considered on FIG. 1 a macroblock AB of the B-picture. This macroblock AB has the same location as a macroblock A2B2, Prec, of P2 that was previously reconstructed. A forward motion vector MV is associated to the macroblock A2B2 from a macroblock A1B1, which belongs to P1. A forward motion vector MVf and a backward motion vector MVb, both associated with AB, are derived from MV as shown in (1). The macroblocks of P1 and P2 associated with the AB macroblock by the forward vector MVf and by the backward vector MVb are respectively K1M1 and K2M2 as illustrated on FIG. 1.

The choice between bidirectional prediction and forward prediction is made at the block level in the B-picture and it depends on where MVb points. Then a MB part of the B-block AB, for which MVb points inside Prec, is bidirectionally predicted and the prediction for this part of the B-block is:

MB(ij)=[A1M1(ij)+A2M2(ij)]/2 where i and j are the spatial coordinates of the pixels.

A AM part of the B-block AB, for which MVb points outside Prec, is forward predicted and the prediction for this part of the B-block AB is:

AM(i,j)=K1A1 (i,j).

An improved method of encoding a PB-frame according to the PB-frames mode is described in the European Patent Application EP 0 782 343 A2. It discloses a predictive method of coding the blocks in the bidirectionally predicted frame, which method introduces a delta motion vector added to or subtracted from the derived forward and backward motion vectors respectively. The described method may be relevant when the motion in a sequence of pictures is non-linear, however it is totally unsuitable for a sequence of pictures where scene-cuts occur. Indeed, when there is a scene cut between a previous P-frame and the B-part of a PB-frame, bidirectional and forward prediction give an erroneous coding. Besides the implementation of the delta vector, which is costly in terms of CPU burden, may result in unnecessary expensive and complicated calculations.

SUMMARY OF THE INVENTION

It is an object of the invention to ameliorate efficiency of existing coding methods, while decreasing CPU burden, and more precisely an object of the invention is to provide an efficient strategy or method which permits to make the most suitable choice among prediction modes for the coding of a given macroblock of a B-frame.

Thus, the choice of the prediction mode for the encoding of each B-block comprises for each B-block in series the steps of:
  deriving the sum of absolute difference between the B-block and a block with pixels values being the means of the pixels values of the Pb-block and of the Pf-block or If-block, hereafter referred to as SADbidir;
  deriving the sum of absolute difference between the B-block and the P-block in the second frame of the PB-frame with same location as the B-block, hereafter referred to as SADb;
  when SADb is greater than SADbidir, making the choice of predictively encoding the B-block based on said P-block with same location as the B-block;
  when SADb is lower than SADbidir:
    deriving the difference between said motion vector and said predictor of the P-block in the P-frame of said PB-frame with same location as the B-block;
    when the obtained difference is lower than a predetermined threshold, making the choice of predictively encoding the B-block based on the P-blocks of the second frame of said PB-frame and the I-blocks or the P-blocks in the previous PB-frame;
    when the obtained difference is greater than the predetermined threshold, deriving the minimum of the sum of absolute difference for the B-block based on the I-blocks in the previous I-frame or on the P-blocks in the previous PB-frame, and making the choice of predictively encoding the B-block based on the I-blocks or the P-blocks in the previous PB-frame.

The claimed method gives, for the coding of a B-block, a strategy for the choice of the prediction mode to be used among the forward, backward and bidirectional modes. The choice is based upon SAD (Sum of Absolute Difference) calculation and motion vector coherence. The strategy is based upon a specific order in the comparisons of the SAD values for the three prediction modes and the introduction of motion coherence. Furthermore the choice of the prediction mode for the encoding of a B-frame is made before any P or B-picture is encoded. Thus, because the proposed strategy is performed on original pictures, the SAD calculations, particularly the calculation of SADbidirectional, do not require a prior bidirectional prediction for the B-frame, which is CPU consuming. The proposed method has the main advantage of not being in favor of bidirectional prediction and allows to perform backward prediction when there is no motion. Thus, the method leads to a suitable choice of prediction mode for a given block of a B-frame.

In a preferred embodiment of the invention, a method according to the invention may either be carried out by a system constituted of wired electronic circuits that may perform the various steps of the proposed method. This method may also be partly performed by means of a set of instructions stored in a computer-readable medium.

BRIEF DESCRIPTION OF THE DRAWINGS

The particular aspects of the invention will now be explained with reference to the embodiments described hereinafter and considered in connection with the accompanying drawings, in which.

DETAILED DESCRIPTION OF THE INVENTION

A misuse of the word "block" may occur in the following paragraphs. When reading block one must understand macroblock, as defined in ITU standards.

Figure 1:
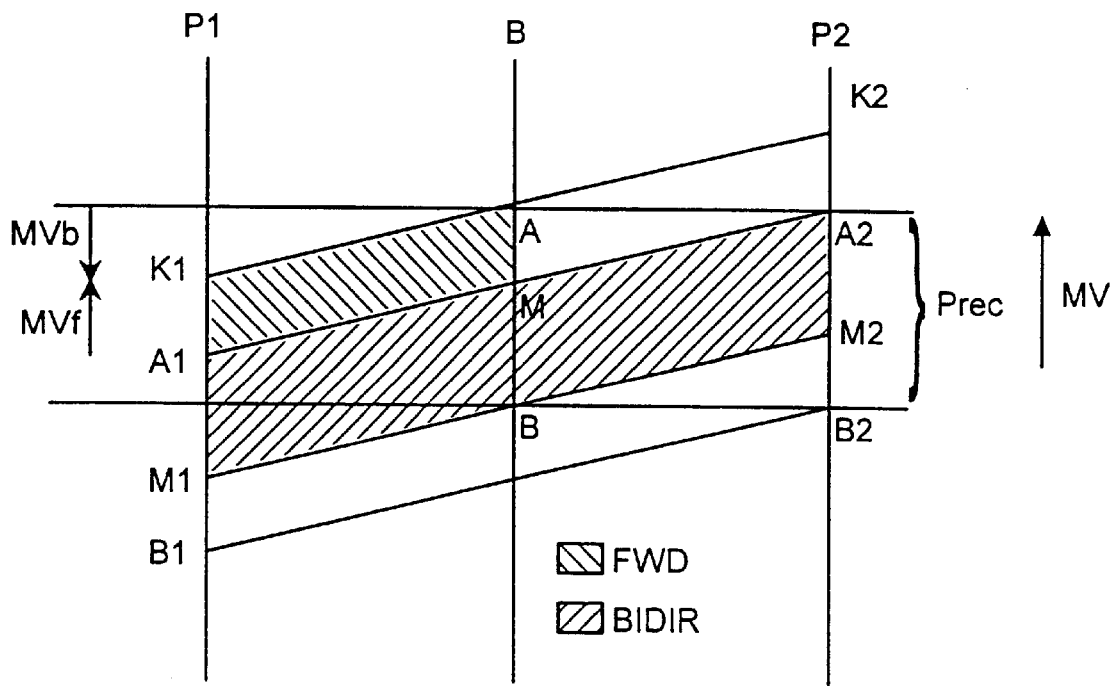
FIG. 1 illustrates a prior art decoding method according to the PB-frames mode.
Figure 2:
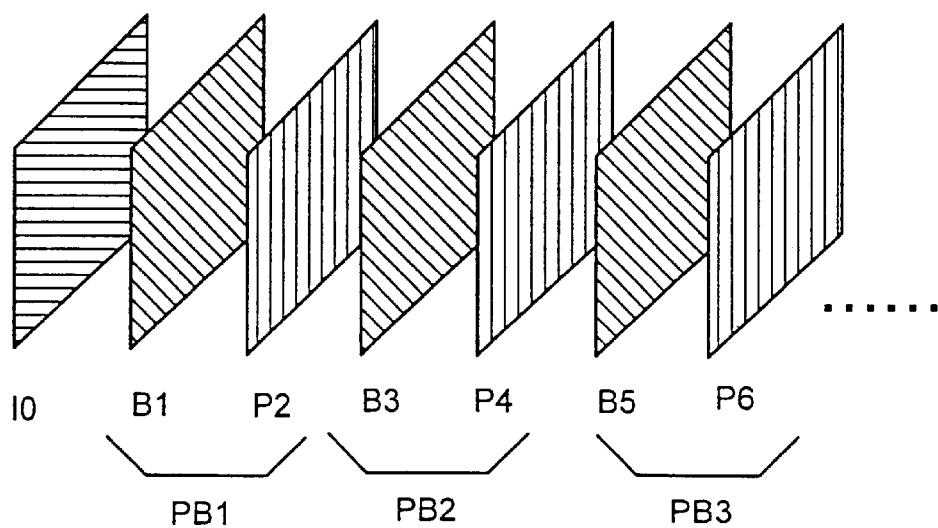
FIG. 2 shows a sequence of pictures for encoding.

FIG. 2 depicts a source sequence of picture frames that has to be encoded following a method in accordance with the invention. This shown sequence is organized in a first I-frame Io temporally followed by a series of PB-frames. Each PB-frame PB1, PB2, PB3 is constituted of a first frame, say, a B-frame and a second frame, say a P-frame. Thus, PB1 is composed of a B-frame B1 and a subsequent P-frame P2, PB2 is composed of a B-frame B3 and a subsequent P-frame P4, PB3 is composed of a B-frame B5 and a subsequent P-frame P6 . . . .

The various frames will be encoded in the order given hereinafter. Io is first encoded according to an Intra mode, i.e. without reference to any other picture. P2 is, then, predictively encoded in reference to Io and, subsequently, B1 is encoded in reference to Io and P1, which is, inside the encoder, internally reconstructed. P4 is then encoded in reference to P2 and, subsequently, B3 is encoded in reference to P2 and P4, which is internally reconstructed too. Thus, each P-block of a PB-frame in the sequence is transmitted and encoded before a B-block of the PB-frame and in reference to the previous I or P-picture. Each B-picture is encoded after the corresponding P-picture of the PB-frame and in reference to said corresponding P-picture of the PB-frame and to the previous I or P-picture encoded.

The sequence of pictures proposed in FIG. 2 is by no means a limitation of the sort of sequences of pictures, which may be encoded following a method in accordance with the invention. In fact, the sequence may also comprise two or more successive B-frames between two P-frames. In such case the B-frames are encoded in the same order as they are transmitted in reference to the previous I or P-frame and the next P-frame, which was previously encoded and which is currently reconstructed.

Figures 3, 4:
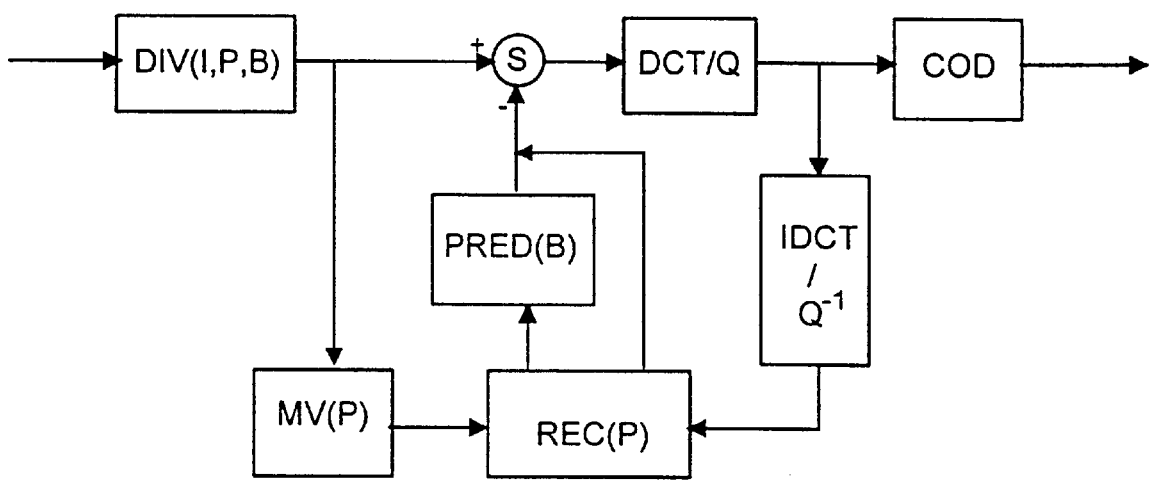
FIG. 3 is a block diagram of the various steps of a coding system.
FIG. 4 allows to understand how the predictor of a motion vector is defined.

A sequence of pictures, such as the one described in FIG. 2, is passed picture-by-picture through the various coding steps of the system in FIG. 3, said system being provided for carrying a method in accordance to the invention. First a circuit DIV(I,P,B) divides each transmitted frame into spatially non-overlapping N×M, say 16×16, macroblocks of pixels for encoding convenience. I, P and B frames are not encoded in the same way, so, they do not follow the same path through the system. Each sort of frame follows an adapted path.

A I-frame, whose encoding does not require reference to any other picture, is passed from the circuit DIV(I,P,B) to a circuit DCT/Q. This circuit DCT/Q transforms a frame received in the spatial domain into a frame in the frequency domain. It applies a discrete cosine transform to the picture divided into blocks of pixels, resulting in a set of transform coefficients, which are then quantized. These quantized coefficients, issuing from the DCT/Q circuit are, then, passed to a circuit COD for further encoding and at the same time to a circuit IDCT/Q−1. The circuit IDCT/Q−1 dequantizes and transforms the coefficients by inverse discrete cosine transform, back in the spatial domain. A circuit REC(P) reconstructs each block of the I-frame and then the I-picture is stored in a memory part of a circuit MV(P).

A P-frame, after division into blocks of pixels by DIV(I, P,B), is transmitted to a motion estimator MV(P). MV(P) comprises a memory part where the previous transmitted I or P-picture is stored. A motion vector MV is derived for each block of the P-picture, hereafter referred to as P-block, in reference to the previous I or P-picture currently stored. This vector MV may be possibly derived by minimizing a function SAD (Sum of Absolute Difference) computed on original blocks rather than reconstructed ones, which is given hereinbelow:

$$SAD = \sum_{m=1}^{16} \sum_{n=1}^{16} |B_{i,j}(m, n) - B_{i-u, j-v}(m, n)|$$

where $B_{i,j}(m,n)$ represents the (m,n)th pixel of the 16×16 P-block at the spatial location (ij) and $B_{i-u,j-v}(m,n)$ represents the (m,n)th pixel of a candidate macroblock in the previous I or P-picture at the spatial location (ij) displaced by the vector (u,v). The motion vector is the displacement between the P-block and the candidate macroblock giving the smallest SAD. Simultaneously, in the circuit MV(P), an associated predictor Mvpred is derived for each motion vector Mv. A possible way of deriving MVpred is given by the H.263 Recommendation as illustrated in FIG. 4, which depicts a P-block and its adjacent neighbouring blocks. MVpred is defined as the median value of MV1, MV2, MV3 where MV1 is the motion vector of the previous macroblock, MV2 is the motion vector of the above macroblock and MV3 is the motion vector of the above right macroblock. In addition to the derivation of MV and MVpred for a given P-block, a forward motion vector MVf and a backward motion vector MVb are derived following the equations given in set 1. These two motion vectors are associated to a B-block in the B-frame of the PB-frame with same location as the P-block. Furthermore MVf, associated to this B-block, defines a I or P-block in the previous I or P-frame, hereafter referred to as If or Pf-block. Similarly MVb, associated to this B-block, defines a P-block in the P-frame of the PB-frame, hereafter referred to as a Pb-block. The difference between this motion compensated P-frame and the previous I or P-frame stored in the memory part of MV(P) is performed in the tap adder S and transmitted to the unit DCT/Q resulting in a quantized transformed frame. This one is, then, passed to the unit COD for further encoding and, at the same time, to the units IDCT/Q−1 and REC(P). Here, REC(P) reconstructs each block of the P-frame from the association of the differential frame received from the circuit IDCT/Q−1, the motion vectors received from the motion estimator MV(P) and the previously I or P-frame stored in the memory part of MV(P). After being reconstructed the memory part of Mv(P) is updated with the current P-frame.

A B-frame is passed directly to a predictor PRED(B) for being predictively encoded according to a forward, backward or bidirectional prediction mode. When encoded in PRED(B)the motion compensated block is subtracted in S from the initial block, the difference is passed through DCT/Q and then to COD for further encoding. A choice has to be made among the three possible prediction modes for each macroblock of the B-frame. In fact, before the effective encoding of the B-picture starts, these choices of the prediction modes are made in series for all the macroblocks. These choices are based upon data received from MV(P) about the original previous I or P-picture and the original P-picture of the PB-frame, both pictures being stored in the memory part of MV(P). The P-picture of the PB-frame is currently reconstructed in REC(P) and it is coded with the B-picture of the PB-frame as one unit. Indeed, once a P-block is reconstructed in REC(P), the B-block of same location in the B-frame is also, in PRED(B), predictively encoded following the prediction mode that was previously chosen for this macroblock.

Figure 5:
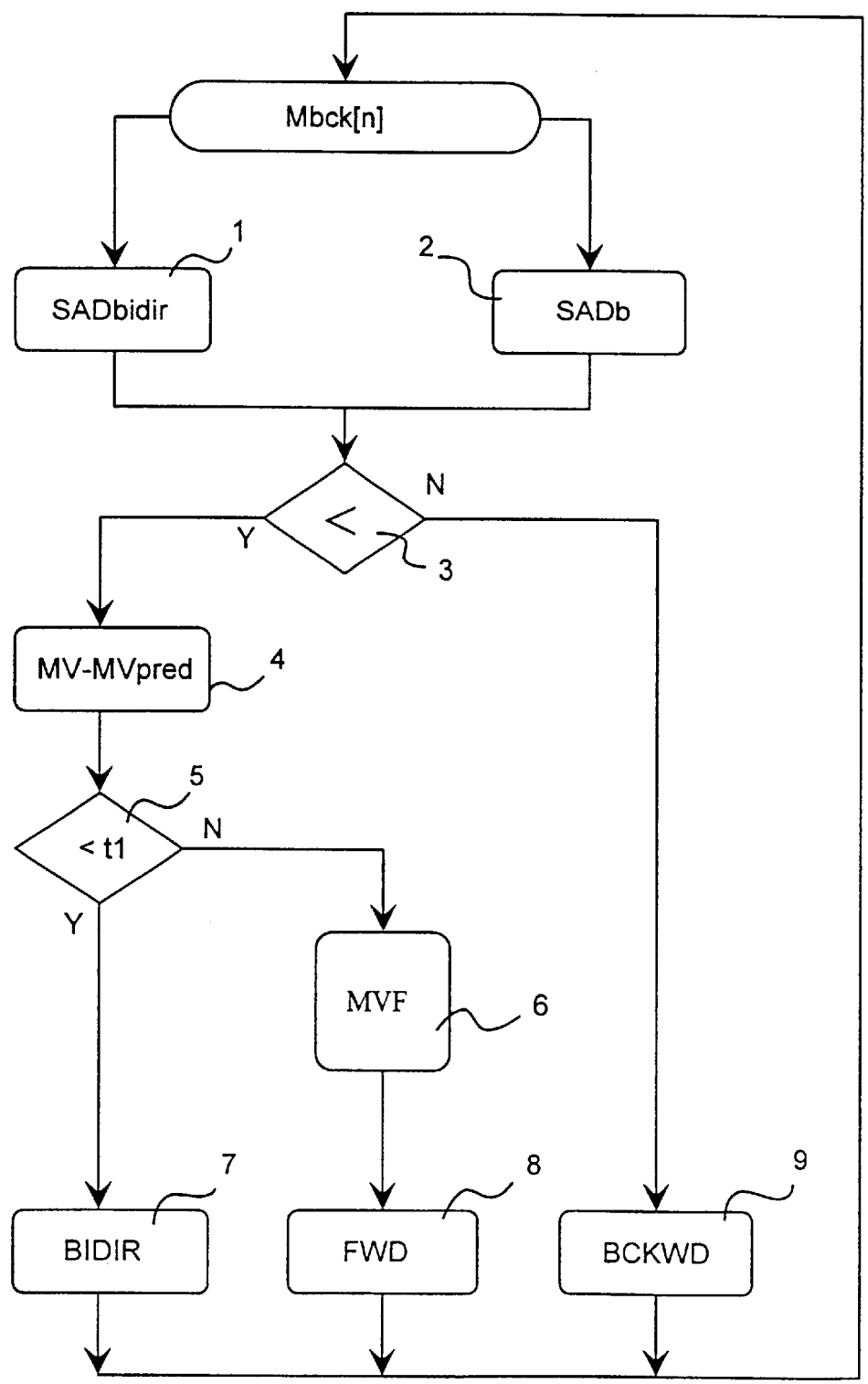
FIG. 5 is a block diagram of the various steps in the encoding of a B-block leading to the choice of a prediction mode in accordance with the invention.

A strategy in accordance with the invention leading to the choice of the prediction mode for a macroblock of a B-frame is depicted in the diagram of FIG. 5. One must recall that in association to each B-block several motion vectors were previously calculated in MV(P): the motion vector MV and its predictor MVpred of the P-block in the P-frame of the PB-frame with same location as the B-block, the forward motion vector MVf that defines the Pf-block and the backward motion vector MVb that defines the Ib or Pb-block.

For each macroblock Mbck[n] of a B-frame transmitted to PRED(B), the SAD is, in a step 1, derived between Mbck[n] and a block with pixels values being the means of the pixels values of the associated Pb-block of the P-frame of the PB-frame and of the If or Pf-block of the previous I or P-frame. This SAD is hereafter referred to as SADbidir. Simultaneously, in a step 2, the SAD between Mbck[n] and the Pb-block is derived and referred to as SADb. Afterwards, SADbidir and SADb are compared in a step 3 and in the case of SADbidir being greater than SADb the choice is made of the backward prediction mode for Mbck[n], which signifies that once the choices are made for all the B-blocks, Mbck[n] will be predictively encoded in reference to the P-picture of the PB-frame. A new B-block, for which the choice of the prediction mode has to be made, is now provided, as shown with the feedback connection in FIG. 5.

In the other case, i.e. when SADbidir is lower than SADb, a motion vector coherence test is performed. The motion vector MV and its predictor MVpred, that are associated to the P-block with same location as the B-block in the P-frame of the PB-frame and that were previously calculated in MV(P), are compared in steps 4 and 5. When the difference MV-MVpred is lower than a predefined threshold t1, bidirectional prediction is chosen in a step 7. The B-block Mbck[n] will be later on, in the encoding of the B-frame, predictively encoded in reference to the previous I or P-picture and the P-picture of the PB-frame. When the difference is greater than t1, the forward prediction is chosen in a step 8 and the B-block Mbck[n] will be, in this case, predictively encoded in reference to the previous I or P-picture. A new macroblock of the B-frame is then provided. For the encoding of a B-block following a forward prediction mode, a forward motion estimation MVF is performed in a step 6. It consists in the derivation of a forward motion vector for the B-block in reference to the previous I or P-picture by minimizing the sum of absolute difference for the B-block calculated in reference to the previous I or P-picture.

It is to be noted that, with respect to the described coding method and system, modifications or improvements may be proposed without departing from the scope of the invention. For instance, it is clear that this coding method can be implemented in several manners, such as by means of wired electronic circuits or, alternatively, by means of a set of instructions stored in a computer-readable medium, said instructions replacing at least a part of said circuits and being executable under the control of a computer or a digital processor in order to carry out the same functions as fulfilled in said replaced circuits. In such a case, these instructions are assembled together in a computer program that can be loaded and stored in said medium and causes any encoding system, such as described above and including said medium, to be able to carry out, by means of an implementation of the same functions as those fulfilled by the replaced circuits, the described encoding method.

What is claimed is:

1. A method of encoding a source sequence of pictures comprising the steps of:
   dividing a source sequence into a set of group of pictures, each group of pictures comprising a first frame, hereafter referred to as I-frame, followed by at least a pair of frames, hereafter referred to as PB-frames;
   dividing each I-frame and PB-frame into spatially non-overlapping blocks of pixels;
   encoding the blocks from said I-frame, hereafter referred to as I-blocks, independently from any other frame in the group of pictures;
   deriving motion vectors and corresponding predictors for the blocks from the temporally second frame of said PB-frame, hereafter referred to as the P-blocks, based on the I-blocks in the previous I-frame or the P-blocks in the previous PB-frame;
   deriving for each block from the first frame of said PB-frame, hereafter referred to as a B-block, a forward motion vector from said motion vector of the P-block with same location, allowing to obtain for each B-block an associated I-block in the previous I-frame or an associated P-block in the previous PB-frame, hereafter referred to as If-block or Pf-block, respectively;
   deriving for each B-block of the first frame of said PB-frame, a backward motion vector from said motion vector of the P-block with same location, allowing to obtain for each B-block an associated P-block in the P-frame of said PB-frame, hereafter referred to as the Pb-block;
   choosing a prediction mode for the encoding of each B-block;
   predictively encoding the P-blocks of the second frame of said PB-frame based on the I-blocks in the previous I-frame or the P-blocks in the previous PB-frame;
   predictively encoding the B-blocks following the chosen prediction mode,
   wherein the choice of the prediction mode for the encoding of each B-block comprises for each B-block in series the steps of:
      deriving the sum of absolute difference between the B-block and a block with pixels values being the means of the pixels values of the Pb-block and of the Pf-block or If-block, hereafter referred to as SADbidir;
      deriving the sum of absolute difference between the B-block and the P-block in the second frame of the PB-frame with same location as the B-block, hereafter referred to as SADb;
      when SADb is greater than SADbidir, making the choice of predictively encoding the B-block based on said P-block with same location as the B-block;
      when SADb is lower than SADbidir:
      deriving the difference between said motion vector and said predictor of the P-block in the P-frame of said PB-frame with same location as the B-block;
      when the obtained difference is lower than a predetermined threshold, making the choice of predictively encoding the B-block based on the P-blocks of the second frame of said PB-frame and the I-blocks or the P-blocks in the previous PB-frame;
      when the obtained difference is greater than the predetermined threshold, deriving the minimum of the sum of absolute difference for the B-block based on the I-blocks in the previous I-frame or on the P-blocks in the previous PB-frame, and making the choice of predictively encoding the B-block based on the I-blocks or the P-blocks in the previous PB-frame.

2. A system for encoding a sequence of pictures comprising:
   means for dividing the source sequence into a set of group of pictures, each group of pictures comprising a first frame, hereafter referred to as I-frame, followed by at least a pair of predictively encoded frames, hereafter referred to as PB-frames;
   means for dividing each I-frame and PB-frame into spatially non-overlapping blocks of pixels;
   a motion estimator for deriving motion vectors and corresponding predictors for the blocks from the temporally second frame of said PB-frame, hereafter referred to as the P-blocks, based on the I-blocks in the previous I-frame or the P-blocks in the previous PB-frame, for deriving for each block from the first frame of said PB-frame, hereafter referred to as B-block, a forward motion vector from said motion vector of the P-block with same location, allowing to obtain for each B-block an associated I-block in the previous I-frame or an associated P-block in the previous PB-frame, hereafter referred to as the If-block or Pf-block respectively and for deriving for each B-block a backward motion vector from said motion vector of the P-block with same location, allowing to obtain for each B-block an associated P-block, hereafter referred to as the Pb-block;
   means for choosing a prediction mode for the encoding of each B-block;
   means for encoding the blocks from said I-frame, hereafter referred to as the I-blocks, independently from any other frame in the group of pictures, for predictively encoding the P-blocks of the second frame of said PB-frame based on the I-blocks in the previous I-frame or the P-blocks in the previous PB-frame and for predictively encoding the B-blocks of the first frame of said PB-frame, wherein the means for choosing the prediction mode for the encoding of each B-block perform for each B-block in series the steps of:

deriving the sum of absolute difference between the B-block and a block with pixels values being the means of the pixels values of the Pb-block and of the Pf-block or If-block, hereafter referred to as SADbidir;

deriving the sum of absolute difference between the B-block and the Pb-block, hereafter referred to as SADb;

when SADb is greater than SADbidir, making the choice of predictively encoding of the B-block based on the P-block with same location as the B-block;

when SADb is lower than SADbidir:

deriving the difference between said motion vector and said predictor of the P-block in the P-frame of said PB-frame with same location as the B-block;

when the obtained difference is lower than a predetermined threshold, making the choice of predictively encoding of the B-block based on the P-blocks and the I-blocks or the P-blocks in the previous PB-frame;

when the obtained difference is greater than the predetermined threshold, deriving the minimum of the sum of absolute difference for the B-block based on the I-blocks in the previous I-frame or on the P-blocks in the previous PB-frame, and making the choice of predictively encoding of the B-block based on the I-blocks or the P-blocks in the previous PB-frame.

3. A system for encoding a sequence of pictures comprising:

means for dividing the source sequence into a set of group of pictures, each group of pictures comprising a first frame, hereafter referred to as I-frame, followed by at least a pair of predictively encoded frames, hereafter referred to as PB-frames;

means for dividing each I-frame and PB-frame into spatially non-overlapping blocks of pixels a motion estimator for deriving motion vectors and corresponding predictors for the blocks from the temporally second frame of said PB-frame, hereafter referred to as the P-blocks, based on the I-blocks in the previous I-frame or the P-blocks in the previous PB-frame, for deriving for each block from the first frame of said PB-frame, hereafter referred to as B-block, a forward motion vector from said motion vector of the P-block with same location, allowing to obtain for each B-block an associated I-block in the previous I-frame or an associated P-block in the previous PB-frame, hereafter referred to as the If-block or Pf-block respectively and for deriving for each B-block a backward motion vector from said motion vector of the P-block with same location, allowing to obtain for each B-block an associated P-block, hereafter referred to as the Pb-block;

means for choosing a prediction mode for the encoding of each B-block;

means for encoding the blocks from said I-frame, hereafter referred to as the I-blocks, independently from any other frame in the group of pictures, for predictively encoding the P-blocks of the second frame of said PB-frame based on the I-blocks in the previous I-frame or the P-blocks in the previous PB-frame and for predictively encoding the B-blocks of the first frame of said PB-frame, wherein said encoding system also comprises a computer-readable medium storing a computer program that itself comprises a set of instructions replacing at least some of said means and being executable under the control of a computer or a digital processor in order to carry out, by means of an implementation of the same functions as those fulfilled by the replaced means, the encoding method according to claim 1.

* * * * *